United States Patent
Lennon et al.

(10) Patent No.: US 7,212,629 B2
(45) Date of Patent: May 1, 2007

(54) MOUSE ENABLED PHONE

(75) Inventors: Paul Philip Lennon, Nepean (CA); Jocelyn H. Cheng, Nepean (CA)

(73) Assignee: Mitel Networks Corporation (CA)

( * ) Notice: Subject to any disclaimer, the term of this patent is extended or adjusted under 35 U.S.C. 154(b) by 269 days.

(21) Appl. No.: 10/457,076

(22) Filed: Jun. 5, 2003

(65) Prior Publication Data
US 2004/0076270 A1 Apr. 22, 2004

(30) Foreign Application Priority Data
Jun. 7, 2002 (GB) ................................ 0213134.0

(51) Int. Cl.
H04M 1/02 (2006.01)
(52) U.S. Cl. ..................... 379/447; 370/401; 455/556.1
(58) Field of Classification Search ............. 379/88.01, 379/88.13, 88.25, 368, 88.1, 88.22, 477; 370/401; 455/517, 566, 41, 556.1, 557; 709/241, 709/203; 345/905; 361/680; 710/105
See application file for complete search history.

(56) References Cited

U.S. PATENT DOCUMENTS

| | | | |
|---|---|---|---|
| 5,832,240 A * | 11/1998 | Larsen et al. | 710/105 |
| 6,343,311 B1 * | 1/2002 | Nishida et al. | 709/203 |
| 6,359,892 B1 * | 3/2002 | Szlam | 370/401 |
| 6,424,843 B1 * | 7/2002 | Reitmaa et al. | 455/566 |
| 2002/0052182 A1 * | 5/2002 | Mayuzumi | 455/41 |
| 2002/0068605 A1 | 6/2002 | Stanley | 455/556.1 |
| 2003/0092384 A1 * | 5/2003 | Ross, III | 455/41 |

FOREIGN PATENT DOCUMENTS

| | | |
|---|---|---|
| DE | 40 08 598 A | 9/1991 |
| DE | 100 34 198 C | 8/2001 |
| EP | 0 788 268 A | 8/1997 |
| GB | 2 356 522 A | 5/2001 |
| JP | 3-123256 | 5/1991 |
| JP | 2000-149721 | 5/2000 |
| JP | 2001-142614 | 5/2001 |
| WO | WO 97-25666 | 7/1997 |
| WO | WO 01/44912 A | 6/2001 |

OTHER PUBLICATIONS

Ruehl H W et al., "SPS51—A universal interface for hands-free telephony, speech recognition and speech storage in the car telephone," Philips Telecommunication Review, Philips Telecommunicatie Industrie N.V. Hilversum, NL, vol. 48, No. 4, Dec. 1, 1990.
European Search Report for corresponding EP Application No. EP 03 25 3594 dated Sep. 18, 2003.
Canadian Examination Letter dated Jan. 4, 2005 in corresponding Canadian Patent Application No. 2,431,124.

* cited by examiner

*Primary Examiner*—Gerald Gauthier
(74) *Attorney, Agent, or Firm*—Beyer Weaver LLP

(57) ABSTRACT

A telephone device includes a housing, a microphone, a loudspeaker and an auxiliary input device coupled to the housing. The auxiliary input device generates output in response to user manipulation. A controller within the housing is coupled to the microphone, loudspeaker and auxiliary input device. The controller is responsive to output of the auxiliary input device to enable a caller to expose and invoke advanced or special features of the telephone device.

8 Claims, 3 Drawing Sheets

TABLE 1:

|  | SHORT LEFT | LONG LEFT | DOUBLE | SHORT RIGHT | LONG RIGHT |
|---|---|---|---|---|---|
| IDLE | GET DTONE (OR GET SPEECH REC) |  |  |  |  |
| RINGING | ANSWER |  |  |  |  |
| DIALING (NO HOLD) |  | DROP CALL |  |  |  |
| TALK (NO HOLD) | TRANS/CONF | DROP CALL |  |  |  |
| DIALTONE (HOLD) |  | BACK TO HOLD |  |  |  |
| RINGBACK (HOLD) |  | BACK TO HOLD |  | RELEASE ME |  |
| TALKING (PARTY ON SOFT HOLD) | TRADE | BACK TO HOLD |  | RELEASE ME | CONFERENCE |
| MASTER OF CONFERENCE | TRANS/CONF | DROP OUT |  |  | SPLIT |
| TALKING & CALL IS WAITING | TRADE (ANSWER) |  |  |  |  |

FIG. 3a

TABLE 2: VOICEMAIL

|  | SHORT LEFT | LONG LEFT | DOUBLE | SHORT RIGHT | LONG RIGHT |
|---|---|---|---|---|---|
| *TALKING TO VOICEMAIL (WAITING FOR PASSWORD | COUNT CLICKS | DROP CALL |  | COUNT CLICKS | NUMBER COMPLETE |
| TALKING TO VOICEMAIL (MAIN MENU) | PLAY/ UNDELETE | DROP CALL |  | GREETINGS | SAVE/SKIP |
| TALKING TO VOICEMAIL (PLAY MENU) | REWIND | DELETE |  | WIND | SAVE |
| TALKING TO VOICEMAIL (GREETINGS) | PRIMARY | DROP CALL? |  | CONDITIONAL | TOGGLE |

* WHEN CREATING OR ENTERING A PASSWORD. THE NUMBER 2706 WOULD BE ENTERED AS FOLLOWS (IF THE MOUSE IS USED):

FIG. 3b

¥ 2 SHORT LEFT CLICKS

MOUSE ENABLED PHONE

FIELD OF THE INVENTION

The present invention relates generally to telephony and in particular to a telephone device that is responsive to output generated by an auxiliary input device such as a mouse to enable a user to invoke advanced or special features of the telephone device without requiring use of the telephone device keys.

BACKGROUND OF THE INVENTION

Advances in telephony equipment have led to a significant increase in the options and features available to users. It is common for telephone devices to include advanced or special features such as conference, call transfer, call trade, etc. that can be accessed and invoked by pressing soft and/or hard keys on the telephone devices. Many of these telephone devices have layered soft key menus requiring users to navigate through one or more screens before being presented with the menu containing the soft key associated with the advanced or special feature of interest. Although sighted users find these telephone devices easy to use, this is not the case for visually impaired users. For a visually impaired user, locating advanced or special feature keys and navigating through the layered soft key menus requires extensive training. As will be appreciated, telephony equipment and telecommunications systems that are easily used by visually impaired users are desired.

It is therefore an object of the present invention to provide a novel a telephone device that is responsive to output generated by an auxiliary input device to enable a user to invoke advanced or special features of the telephone device without requiring use of the telephone device keys.

SUMMARY OF THE INVENTION

According to one aspect of the present invention there is provided a telephone device comprising:
  a housing;
  a microphone;
  a loudspeaker;
  an auxiliary input device coupled to said housing, said auxiliary input device generating output in response to user manipulation;
  a controller within said housing, said controller being coupled to said microphone, loudspeaker and auxiliary input device, said controller being responsive to output of said auxiliary input device to enable a caller to invoke features of said telephone device.

Preferably, the microphone and loudspeaker are accommodated in a handset coupled to the housing and wherein the auxiliary input device is a mouse coupled to housing. The controller stores a map for mapping output of the mouse to features of the telephone device. The controller makes special features of the telephone device available for selection (i.e. exposes) in response to right, left, short and long mouse clicks allowing a user to select the exposed features using the mouse.

Preferably the controller initiates a call to a voice recognition facility in response to output of the mouse when the telephone device is idle. It is also preferred that the controller automatically initiates a call to the voice recognition facility when the telephone device goes off hook and output is received from the mouse.

Preferably, the controller is also responsive to output of the mouse to enable a caller to navigate through menus of a voice-mail facility. The controller stores a map between menu selections of the voice-mail facility and mouse clicks.

Preferably, the auxiliary input device is a mouse and auxiliary input device output is generated in response to mouse clicks. It is also preferred that auxiliary input device output is generated in response to left, right, short and long mouse clicks.

According to another aspect of the present invention there is provided in a telephone device including a housing, a microphone, and a loudspeaker, the improvement comprising:
  an auxiliary input device coupled to the housing that generates output in response to user manipulation; and
  a controller coupled to the microphone, loudspeaker and auxiliary input device, the controller exposing and invoking features of said telephone device in response to output of the auxiliary input device.

According to yet another aspect of the present invention there is provided a method of initiating telephone device special features comprising the steps of:
  mapping special features of a telephone device to auxiliary input device output;
  in response to auxiliary input device output, determining the special feature associated therewith; and
  invoking the determined special feature.

According to still yet another aspect of the present invention there is provided a telecommunications system comprising:
  a telephone switch; and
  at least one telephone device coupled to said telephone switch, said at least one telephone switch including:
    a housing;
    a microphone;
    a loudspeaker;
    an auxiliary input device coupled to said housing, said auxiliary input device generating output in response to user manipulation; and
    a controller within said housing, said controller being coupled to said microphone, loudspeaker and auxiliary input device, said controller being responsive to output of said auxiliary input device to enable a caller to invoke features of said telephone device;
  wherein, said telephone switch is responsive to output generated by said at least one telephone device in response to said invoked features.

The present invention provides advantages in that a user can use the auxiliary input device to navigate through menus and/or invoke special features of the telephone device without requiring visual contact with the telephone device. This of course makes the telephone device particularly suitable for use by the visually impaired.

BRIEF DESCRIPTION OF THE DRAWINGS

An embodiment of the present invention will now be described more fully with reference to the accompanying drawings in which:

FIG. 3a shows an example of mouse click to telephone device special feature mappings; and FIG. 3b shows an example of mouse click to voice-mail facility menu mappings.

DETAILED DESCRIPTION OF THE PREFERRED EMBODIMENT

Figure 1:
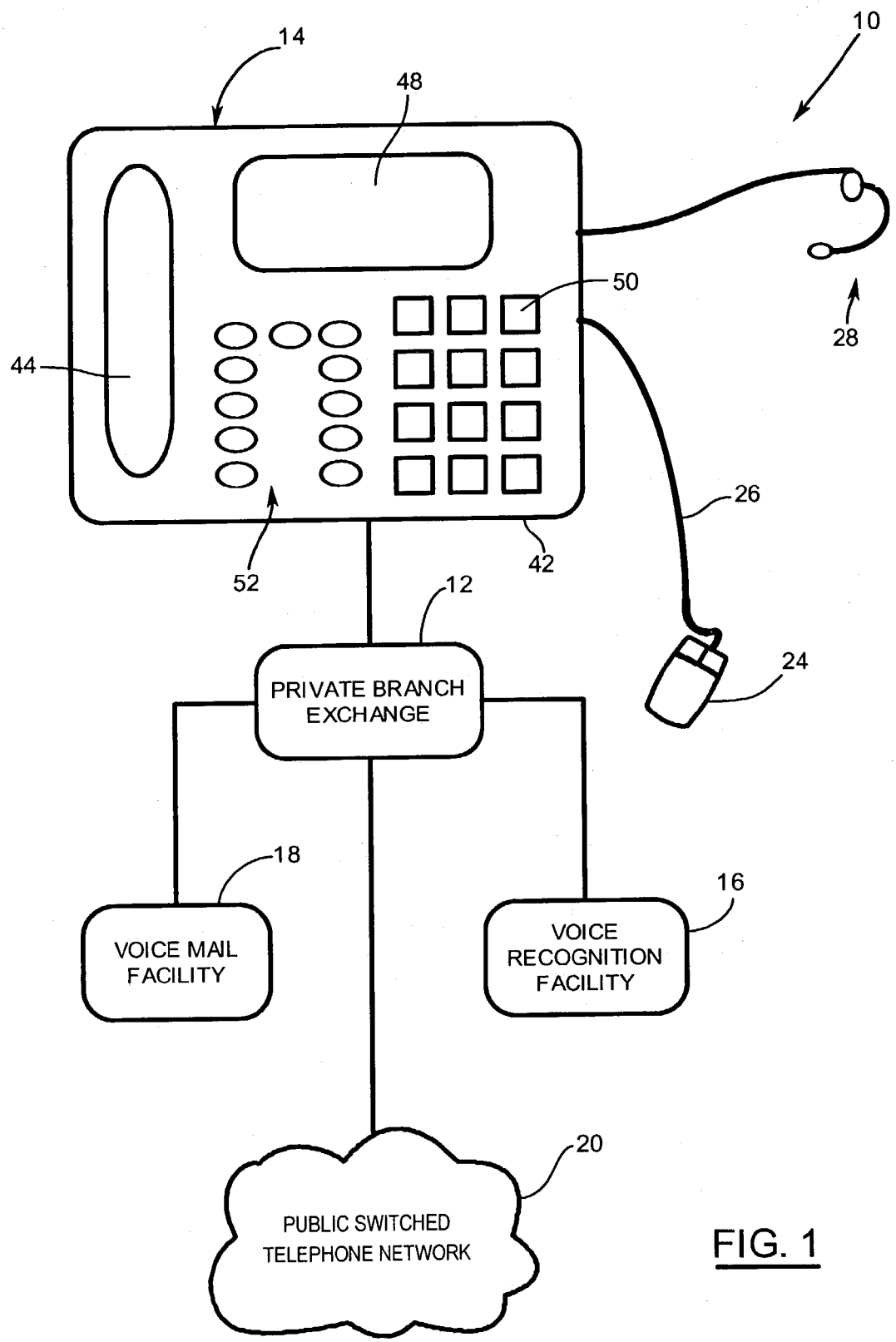
FIG. 1 is a schematic diagram showing a telecommunications system in accordance with the present invention.

Turning now to FIG. 1, a telecommunications system is shown and is generally identified by reference numeral 10. Telecommunications system 10 allows a caller to initiate a telephone call to a desired party using voice recognition thereby to avoid the caller having to dial manually the desired party's telephone number. As can be seen, telecommunications system 10 includes a private branch exchange (PBX) 12 coupled to a telephone device 14. Although only one telephone device 14 is shown, those of skill in the art will appreciate that this is for ease of illustration only. PBX 12 is also coupled to a voice recognition facility 16, a voice-mail facility 18 and a public switched telephone network (PSTN) 20.

Voice recognition facility 16 includes an applications server hosting a voice recognition application and a database that stores a list of names and associated telephone numbers. The voice recognition application can be developed from a server-based speech recognition development kit such as those provided by Nuance, Speechworks, Phillips or Lucent for example. Alternatively, the voice recognition application may be a complete server-based application such as those provided by. Mitel Networks Corporation, Speechworks, Phillips or Locus for example.

The voice-mail facility 18 also includes an applications server hosting a voice mail application and a database that stores voice mail messages and greetings left by callers.

The telephone device 14 is designed to facilitate use by a visually impaired user. In the present embodiment, the telephone device 14 is a Mitel SS400 series telephone set, such an a SS4125 or SS4150 telephone set, and includes an RS-232 serial interface 90 (see FIG. 2) and a headset jack (not shown). An auxiliary input device 24 in the form of a two-button mouse is coupled to the serial interface 90 via a cable 26. A headset 28 is shown coupled to the headset jack.

Figure 2:
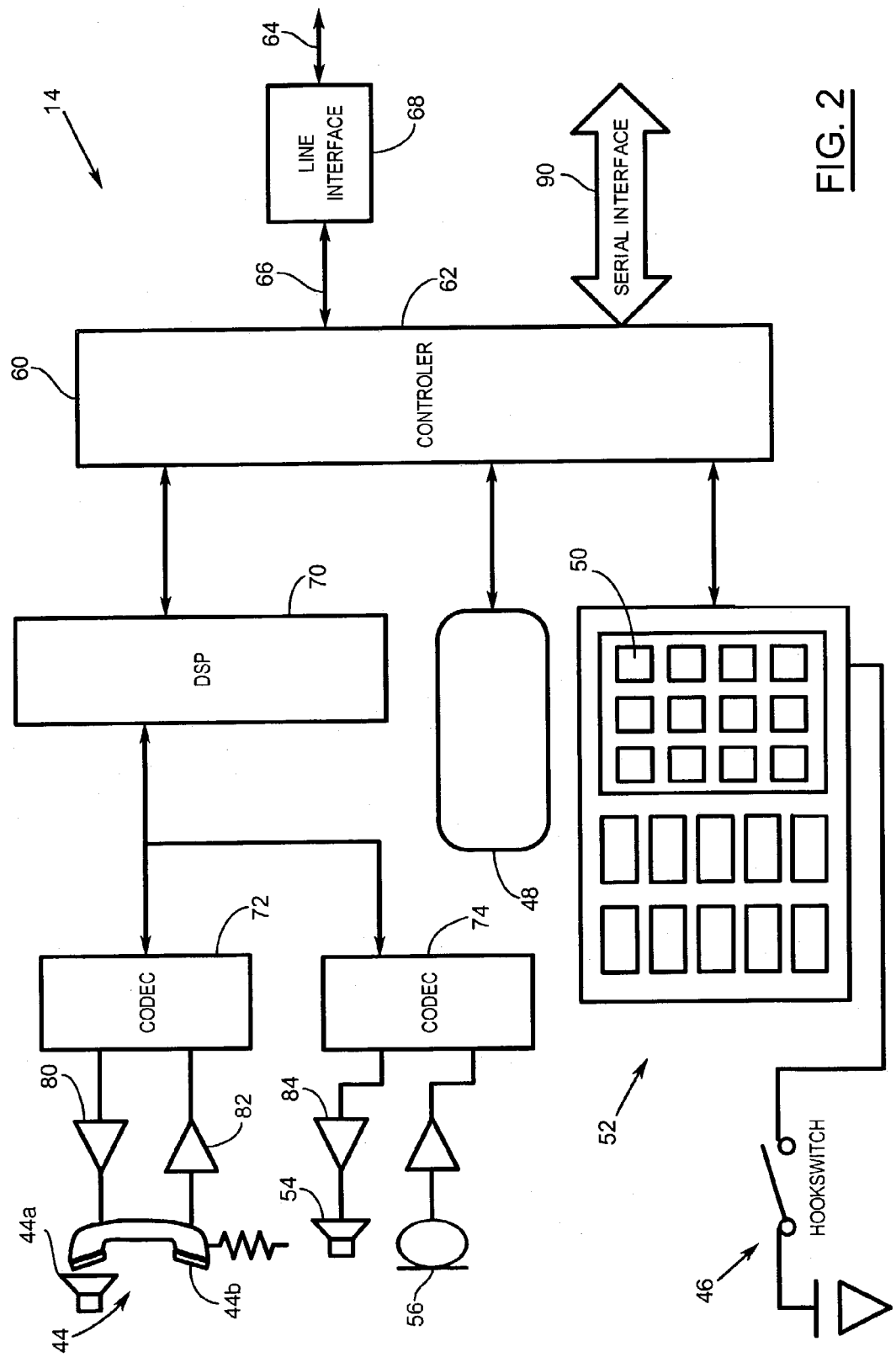
FIG. 2 is a schematic block diagram of a telephone device forming part of the telecommunications system of FIG. 1.

Turning now to FIGS. 1 and 2, the telephone device 14 will now be further described. As can be seen, telephone device 14 includes a housing 42 with a cradle that accommodates a handset 44 having a speaker 44a and a microphone 44b. A hookswitch 46 is associated with the cradle. A display 48 that presents soft keys and keyboards 50 and 52 having hard keys are provided on the housing 42. A loudspeaker 54 and a microphone 56 are also provided to enable "hands-free" calls to be carried out.

Disposed within the housing 42 are the telephone device electronics generally identified by reference number 60. As can be seen, the telephone device electronics 60 include a controller 62 coupled to a communications line 64 via an audio bus 66 and a line interface 68. The communications line 64 leads to the PBX 12.

A digital signal processor (DSP) 70 communicates with the controller 62 and with a pair of coder/decoders (Codecs) 72 and 74. Codec 72 is coupled to the speaker 44a and the microphone 44b of the handset 42 via amplifiers 80 and 82 respectively. Codec 74 is coupled to the loudspeaker 54 and the microphone 56 via amplifiers 84 and 86 respectively. The DSP 70 provides volume control, hands-free functionality, tone generation, and other necessary functionality for the operation of the telephone device 14. The controller 62 communicates with the display 48 and the keyboards 50 and 52, and connects either one or both voice channels of the telephone device 14 to the line interface 68 in response to a user initiated call or an incoming call that is answered.

The controller 62 is also coupled to the serial interface 90 and is programmed to interpret input from the auxiliary input device 24, in this embodiment, left and right mouse clicks and long and short mouse clicks. In response to mouse clicks received from the auxiliary input device 24, the controller 62 exposes functions of the telephone device 14 and invokes selected functions to provide a visually impaired user with the ability to initiate telephone calls and to take advantage of other telephone device features (hereinafter referred to as "special" features) without requiring visual assistance. Specifically, the controller 62 is programmed to enable a visually impaired user to use the auxiliary input device 24 to establish a connection between the telephone device 14 and the voice recognition facility 16, to establish a connection between the telephone device 14 and the voice-mail facility 18, to terminate a call, to initiate a call transfer, to complete a call transfer, to trade a call, to form a conference call, to split a conference call, to answer a camped call and put an active call on hold and to return a call on hold to an active call. Further specifics of the operation of the telephone device 14 will now be described.

When an auxiliary input device 24 is coupled to the serial interface 90, and the handset 44 of the telephone device 14 is lifted from the cradle to go off-hook, or if input is received from the auxiliary input device 24 and the telephone device 14 is on-hook and idle (signifying a hands-free speaker or headset call), rather than providing the caller with a dial tone via the DSP 70, the controller 62 automatically places a call to the voice recognition facility 16. Once a call between the voice recognition facility 16 and the telephone device 14 has been established, the voice recognition application plays a canned voice message prompt to the caller asking the caller to speak the name or telephone number of the party to be called. If the caller speaks the name of the party to whom the call is to be routed, the voice recognition application compares the spoken name with the names in the database list. When a match is determined, the voice recognition application echoes the name in the database that is associated with the spoken name. If the caller says nothing within a certain period of time, the voice recognition application conveys the telephone number associated with the spoken name to the PBX 12 to allow the call to be routed. If the name echoed by the voice recognition application is incorrect, the caller can re-start the process by saying "cancel" and then repeating the name of the party to be called.

Similarly, if the caller speaks the telephone number of the party to whom the call is to be routed, the voice recognition application compares the spoken telephone number with the telephone numbers in the database list. When a match is determined, the voice recognition application echoes the name in the database that is associated with the spoken telephone number. If the caller says nothing within a certain period of time, the voice recognition application conveys the telephone number to the PBX 12 to allow the call to be routed. If the name echoed by the voice recognition application is incorrect, the caller can re-start the process by saying "cancel" and then repeating the telephone number of the party to be called.

When the PBX 12 receives the telephone number from the voice recognition facility 16, the PBX conveys the telephone number to the PSTN 20 if the party being called is external to enable the telephone call to be completed. In this manner, the auxiliary input device 24 enables a visually impaired user to initiate a call using voice recognition without requiring the user to seek visual assistance.

The controller 62 is also programmed to interpret right and left as well as long and short duration mouse clicks to enable a caller to advance through menu selections of the voice-mail facility 18 and to enable the caller to take advantage of special features of the telephone device 14. Specifically, a map between mouse clicks and voice-mail menus and a map between telephone device special features and mouse clicks are stored in the controller 62. In the present embodiment, short duration mouse clicks are those having a duration up to 0.7 seconds and long duration mouse clicks are those having a duration greater than 1.0 seconds.

FIG. 3a shows exemplary mappings between mouse clicks and some telephone device special features. As can be seen, when the telephone device 14 is idle and a short left mouse click is received, the controller 62 places a call to the voice recognition facility 16 allowing the user to make a telephone call. If the telephone device 14 is ringing, the controller 62 answers the incoming call in response to a short left mouse click. During dialing of a call, if the user enters a long left mouse click, the call being dialed is dropped by the controller 62.

While a call is in progress, the transfer/conference feature is invoked by the controller 62 in response to a short left mouse click. The call in progress is dropped by the controller 62 in response to a long left mouse click. When the transfer/conference feature is invoked and a call with a party is in progress, the controller 62 places the party on hold and presents the caller with a dial tone. With the dial tone present, if a long left duration mouse click is received by the controller, the controller 62 returns the held call to active.

If the user completes a call to a third party and a ring back signal is received, the controller 62 returns the caller back to the held call in response to a long left mouse click. The controller 62 connects the two outside parties in response to a short duration right mouse click. If the call to the third party is answered, the controller 62 trades the call in response to a short left mouse click, returns the call back to the held party in response to a long left mouse click, releases the call in response to a short right mouse click, and conferences all parties in response to a long right mouse click.

If the caller is the master of the conference (i.e. set the conference call up), the controller 62 invokes the transfer/conference feature in response to a short left mouse click. The controller 62 drops the master from the call in response to a long left mouse click and splits the call in response to a long right mouse click. If a telephone conversation is in progress and a call is waiting, controller 62 trades the existing call with the waiting call in response to a short left mouse click.

FIG. 3b shows exemplary mappings between mouse clicks and menus of the voice-mail facility 18. As can be seen, when a call is made to the voice-mail facility 18 alternate short left and right mouse clicks are used to enter a password. A long left mouse click drops a call to the voice-mail facility 18 while a duration right mouse click signifies complete entry of the password. Once a connection to the voice-mail facility 18 has been made, the play menu can be opened by entering a short left mouse click. Messages can be saved or skipped by entering long right clicks. Entering a short duration mouse click opens the greetings menu.

When the play menu is opened and a message is being played, a short left mouse click rewinds the message. A long left mouse click deletes the message, a short right mouse click fast forwards the message and a long left mouse click saves the message.

When the greeting menu is opened, a short left mouse left click plays the caller's primary greeting. A long left mouse click drops the call to the voice-mail facility 18. A short right mouse click plays the caller's conditional or secondary greeting. A long right mouse click allows the caller to swap the primary and conditional greetings.

As will be appreciated, the controller 62 accesses the appropriate maps to facilitate control of the telephone device 14 via the auxiliary input device 24. In this manner, a visually impaired caller has easy access to enhanced features of the telephone device 14 and can easily navigate through the voice-mail facility 18 without requiring visual assistance. A mouse is easy for a visually impaired user to locate and is ergonomically designed for ease of use without requiring visual contact. In view of this, by mapping mouse clicks to special features of the telephone device, a standard ergonomic substitute for invoking telephone device special features is made available.

Although a two-button mouse has been described, those of skill in the art will appreciate that a three-button mouse or other similar auxiliary input device that is easily controlled by a visually impaired user can be used. Also, those of skill in the art will appreciate that the mappings shown in FIGS. 3a and 3b are exemplary in nature. Alternative mouse click to telephone device special feature mappings may be used.

Although a preferred embodiment of the present invention has been described, those of skill in the art will appreciate that variations and modifications may be made without departing from the spirit and scope thereof as defined by the appended claims.

What is claimed is:

1. A telephone device comprising:
a housing;
a microphone;
a loudspeaker;
an auxiliary input device coupled to said housing, said auxiliary input device generating output in response to user manipulation;
a controller within said housing, said controller being coupled to said microphone, loudspeaker and auxiliary input device, said controller being responsive to output of said auxiliary input device to enable a caller to invoke features of said telephone device,
wherein said controller stores a map mapping output of said mouse to special features of said telephone device,
wherein said microphone and loudspeaker are accommodated in a handset coupled to said housing and wherein said auxiliary input device is a mouse coupled to said housing, and
wherein said controller is responsive to right, left, short and long mouse clicks.

2. A telephone device according to claim 1 wherein said controller initiates a call to a voice recognition facility in response to output of said mouse when said telephone device is idle.

3. A telephone device according to claim 2 wherein said controller automatically initiates a call to said voice recognition facility when said telephone device goes off hook and output is received from said mouse.

4. A telephone device according to claim 1 wherein said controller is responsive to output of said mouse to enable a caller to navigate through menus of a voice-mail facility.

5. A telephone device according to claim 4 wherein said controller stores a map between menu selections of said voice-mail facility and mouse clicks.

6. A telephone device according to claim 4, wherein said controller is responsive to alternate short left and right mouse clicks for user entry of a password for said voice-mail facility.

7. A telephone device according to claim 6 wherein said controller stores a map between menu selections of said voice-mail facility and mouse clicks.

8. A method of initiating telephone device special features comprising the steps of:
   mapping special features of a telephone device to auxiliary input device output;
   in response to auxiliary input device output, determining the special feature associated therewith; and
   invoking the determined special feature,
   wherein said auxiliary input device is a mouse and wherein said output is generated in response to mouse clicks, and
   wherein said auxiliary input device output is generated in response to left, right, short and long mouse clicks.

* * * * *